(12) United States Patent
Tomiie

(10) Patent No.: US 11,400,842 B2
(45) Date of Patent: Aug. 2, 2022

(54) VEHICLE SEAT

(71) Applicant: MAZDA MOTOR CORPORATION, Hiroshima (JP)

(72) Inventor: Susumu Tomiie, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 30 days.

(21) Appl. No.: 16/633,766

(22) PCT Filed: Jul. 27, 2018

(86) PCT No.: PCT/JP2018/028283
§ 371 (c)(1),
(2) Date: Jan. 24, 2020

(87) PCT Pub. No.: WO2019/022237
PCT Pub. Date: Jan. 31, 2019

(65) Prior Publication Data
US 2020/0215945 A1 Jul. 9, 2020

(30) Foreign Application Priority Data
Jul. 27, 2017 (JP) .............................. JP2017-145338

(51) Int. Cl.
*B60N 2/64* (2006.01)
*B60N 2/70* (2006.01)

(52) U.S. Cl.
CPC ....... *B60N 2/64* (2013.01); *B60N 2/70* (2013.01)

(58) Field of Classification Search
CPC ................................... B60N 2/64; B60N 2/70
See application file for complete search history.

(56) References Cited

U.S. PATENT DOCUMENTS

| | | | | |
|---|---|---|---|---|
| 5,816,661 A | * | 10/1998 | Sakurai ................ | B60N 2/70 |
| | | | | 297/452.48 |
| 2003/0127902 A1 | * | 7/2003 | Fujita .................. | 297/452.48 |

(Continued)

FOREIGN PATENT DOCUMENTS

| JP | 2002-052616 A | 2/2002 |
|---|---|---|
| JP | 2005287935 A | 10/2005 |

(Continued)

OTHER PUBLICATIONS

The extended European search report issued by the European Patent Office dated May 8, 2020, which corresponds to European Patent Application No. 18837938.2-1010 and is related to U.S. Appl. No. 16/633,766.

(Continued)

*Primary Examiner* — Anthony D Barfield
(74) *Attorney, Agent, or Firm* — Studebaker & Brackett PC

(57) ABSTRACT

Disclosed is a vehicle seat (1) comprising a seat back (4) and a seat cushion (2), wherein the seat back comprises a hipbone supporting portion (4a) for supporting the hipbones of a seated occupant, and a thorax supporting portion (4b) provided above the hipbone support portion to support the thorax of the seated occupant, and the seat cushion (2) comprises an ischium supporting portion (2a) oriented to extend approximately horizontally to support ischial tuberosity point (8a) of the seated occupant, and a femur supporting portion (2b) provided forward of the ischium supporting portion to extend obliquely upwardly from the ischium supporting portion, and wherein the seat back is configured such that a spring constant (k3) of the thorax supporting portion is equal to or less than a spring constant (k2) of the hipbone supporting portion.

8 Claims, 4 Drawing Sheets

(56) References Cited

U.S. PATENT DOCUMENTS

| | | |
|---|---|---|
| 2007/0236071 A1 | 10/2007 | Fujita et al. |
| 2009/0051206 A1* | 2/2009 | Fujita ..................... B60N 2/70 |
| | | 297/452.49 |
| 2013/0175838 A1 | 7/2013 | Oshima et al. |
| 2017/0028889 A1 | 2/2017 | Kumagai et al. |

FOREIGN PATENT DOCUMENTS

| | | |
|---|---|---|
| JP | 2012176330 A | 9/2012 |
| JP | 2014008843 A | 1/2014 |
| JP | 2015199447 A | 11/2015 |

OTHER PUBLICATIONS

An Office Action mailed by the Japanese Patent Office dated Jul. 6, 2020, which corresponds to Japanese Patent Application No. 2017-145338 and is related to U.S. Appl. No. 16/633,766.
International Search Report issued in PCT/JP2018/028283; dated May 15, 2018.
Office Action issued in JP 2017-145338; mailed by the Japanese Patent Office dated May 13, 2019.
Office Action issued in JP 2017-145338; mailed by the Japanese Patent Office dated Dec. 9, 2019.
International Preliminary Report on Patentability and Written Opinion issued in PCT/JP2018/028283; dated Jan. 28, 2020.

\* cited by examiner

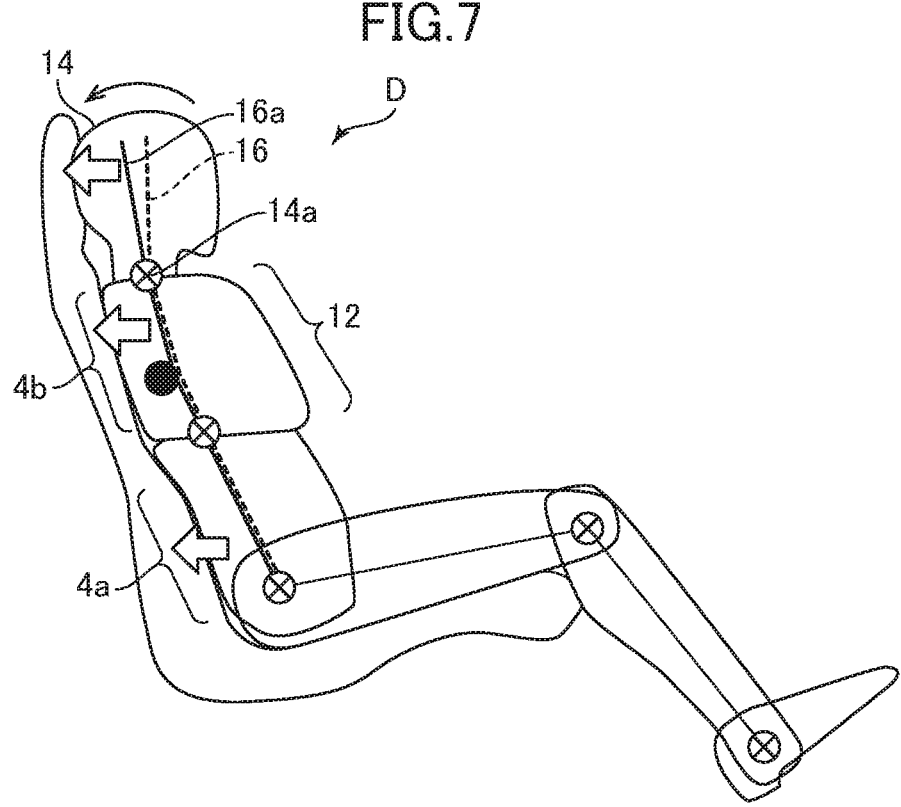

VEHICLE SEAT

TECHNICAL FIELD

The present invention relates to a vehicle seat, and particularly to a vehicle seat which comprises a seat back and a seat cushion.

BACKGROUND ART

JP 2015-199447A (Patent Document 1) discloses a vehicle seat. This vehicle seat comprises a seat cushion, a seat back, and a headrest, wherein the height position of a back-side seating surface of the seat cushion is set to be lower than the height position of a thigh holding portion and to be lower than the height position of a pelvis holding portion. In the invention described in the Patent Document 1, the seat cushion is configured in this manner, thereby enabling smooth getting-on/off a vehicle, while maintaining holding capability during seating.

CITATION LIST

Patent Document

Patent Document 1: JP 2015-199447A

SUMMARY OF INVENTION

Technical Problem

However, through researches of the present inventor, it was gradually discovered that a seat capable of providing satisfactory riding comfort still cannot be obtained only by improving the shape of a seat cushion as in the invention described in the Patent Document 1. That is, only by adequately supporting the pelvis and femurs (thighbones) as in the invention described in the Patent Document 1, it is difficult for a seated occupant to maintain a proper driving position. As a result of various researches with a focus on the behavior of a human head during walking, the present inventor has found that a seated occupant can naturally maintain a proper driving position as if he/she were walking, by adequately holding a specific area of the upper body of the occupant in addition to the pelvis and femurs thereof. Specifically, natural human athletic ability frequently exhibited by a human during walking (ability of keeping a dynamic balance of the head) can be brought out by adequately supporting each region of the seated occupant, so that the occupant can naturally maintain a proper driving position. This makes it possible to provide a vehicle seat capable of providing significantly good riding comfort.

It is therefore an object of the present invention to provide a vehicle seat capable of enabling an occupant to naturally maintain a proper driving position.

Solution to Technical Problem

In order to solve the above problem, the present invention provides a vehicle seat which comprises a seat back including a hipbone supporting portion for supporting a hipbone of a seated occupant, and a thorax supporting portion provided above the hipbone support portion to support a thorax of the seated occupant; and a seat cushion including an ischium supporting portion oriented to extend approximately horizontally to support an ischial tuberosity point of the seated occupant, and a femur supporting portion provided forward of the ischium supporting portion to extend obliquely upwardly from the ischium supporting portion, wherein the seat back is configured such that a spring constant of the thorax supporting portion is equal to or less than a spring constant of the hipbone supporting portion.

When a vehicle is accelerated, the body of an occupant seated in the vehicle seat is pressed against the seat back of the vehicle seat by the acceleration. In this situation, if the upper body of the occupant is not supported by an adequate holding force, a force will be applied to the head of the occupant to cause rotation thereof. Therefore, the occupant needs to strain at the neck so as to keep the head at an adequate angle and position, i.e., cannot easily maintain a proper posture. For example, in the situation where the upper body of the occupant is pressed against the seat back due to the acceleration of the vehicle, if a portion of the seat back which holds the thorax (rib cage) of the occupant is not displaced, a force is applied to the head of the occupant to cause the head to be rotated rearwardly about the cervical spine serving as a supporting point, leading to deterioration in riding comfort. In contrast, according to the above feature of the present invention, the seat back is configured such that the spring constant of the thorax supporting portion is equal to or less than the spring constant of the hipbone supporting portion. Therefore, the thorax and head of the occupant pressed against the seat back by the acceleration are moved in an approximately translational manner, so that a force causing the head to be rotated rearwardly becomes smaller. This allows the occupant to easily maintain a proper posture.

Preferably, in the vehicle seat of the present invention, the seat cushion is configured such that a spring constant of the femur supporting portion is less than a spring constant of the ischium supporting portion.

In the vehicle seat of the present invention, the ischium supporting portion for supporting the ischial tuberosity point is oriented to extend approximately horizontally, and the femur supporting portion is oriented to extend forwardly and obliquely upwardly from the ischium supporting portion. Thus, the pelvis of an occupant seated in the vehicle seat is naturally guided to the ischium supporting portion located between the seat back and the femur supporting portion, and the ischial tuberosity point of the occupant are properly supported by the approximately horizontal ischium supporting portion. In this way, the spine of the occupant is supported by the seat back, in a state in which it describes a natural S-shaped curve in side view. However, when the femur supporting portion is configured to extend forwardly and obliquely upwardly from the ischium supporting portion, it is likely to hinder a pedal manipulation by the foot of the occupant. In contrast, according to the above feature, the spring constant of the femur supporting portion is less than the spring constant of the ischium supporting portion, so that the femur supporting portion can be easily displaced during the pedal manipulation by the occupant, thereby suppressing a negative influence on the pedal manipulation.

Preferably, in the vehicle seat of the present invention, the hipbone supporting portion is provided to fall within a range of 70 mm to 230 mm as measured vertically upwardly from a position of the ischial tuberosity point of the seated occupant.

According to this feature, the hipbone supporting portion is provided to fall within the range of 70 mm to 230 mm as measured vertically upwardly from the position of the ischial tuberosity point of the seated occupant, so that it is possible to properly support the hipbones of any of a large number of occupants having various physiques.

Preferably, in the vehicle seat of the present invention, the thorax supporting portion is provided to fall within a range of 300 mm to 500 mm as measured vertically upwardly from the position of the ischial tuberosity point of the seated occupant.

According to this feature, the thorax supporting portion is provided to fall within the range of 300 mm to 500 mm as measured vertically upwardly from the position of the ischial tuberosity point of the seated occupant, so that it is possible to properly support the thorax of any of a large number of occupants having various physiques.

Preferably, in the vehicle seat of the present invention, the femur supporting portion is provided to fall within a range of 80 mm to 250 mm as measured horizontally forwardly from a position of the ischial tuberosity point of the seated occupant.

According to this feature, the femur supporting portion is provided to fall within the range of 80 mm to 250 mm as measured horizontally forwardly from the position of the ischial tuberosity point of the seated occupant, so that it is possible to properly support the femurs of any of a large number of occupants having various physiques.

Preferably, in the vehicle seat of the present invention, the ischium supporting portion is provided to fall within a range of 60 mm to 150 mm as measured horizontally forwardly from a position of a rear end of the hipbones of the seated occupant.

According to this feature, the ischium supporting portion is provided to fall within the range of 60 mm to 150 mm as measured horizontally forwardly from the position of the rear ends of the hipbones of the seated occupant, so that it is possible to properly support the pelvis of any of a large number of occupants having various physiques.

Effect of Invention

The vehicle seat of the present invention can enable an occupant to naturally maintain a proper driving position.

BRIEF DESCRIPTION OF DRAWINGS

FIG. 7 is a diagram schematically showing, as a comparative example, the movement of the spinal column of an occupant seated in a conventional vehicle seat, in a state in which a vehicle equipped with the vehicle seat is accelerated.

DESCRIPTION OF EMBODIMENTS

With reference to the accompanying drawings, a vehicle seat according to one preferred embodiment of the present invention will now be described.

Figure 1:
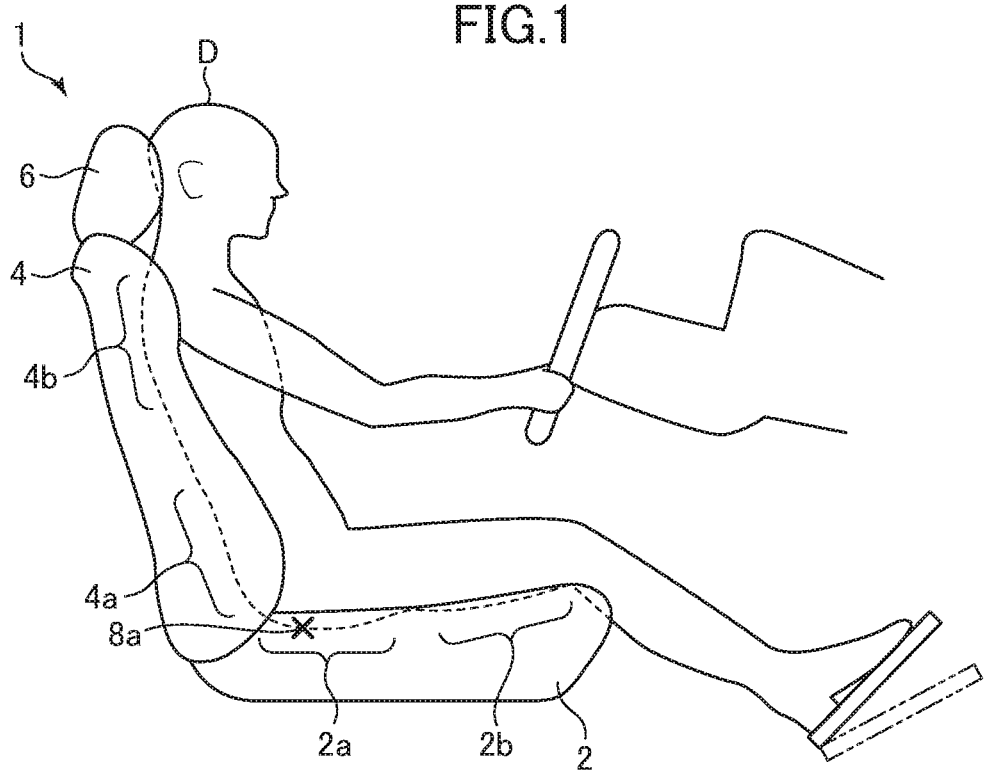
FIG. 1 is a schematic diagram showing the entirety of a vehicle seat according to one embodiment of the present invention.
Figure 2:
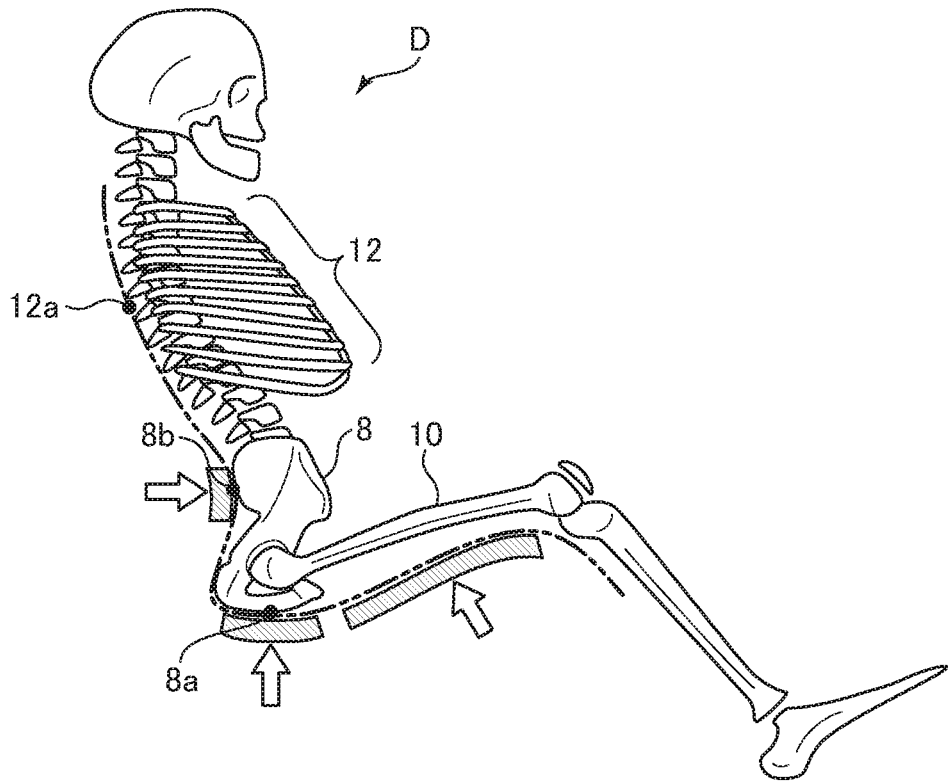
FIG. 2 is a diagram illustrating the support of the bones of an occupant by the vehicle seat according to this embodiment.
Figure 3:
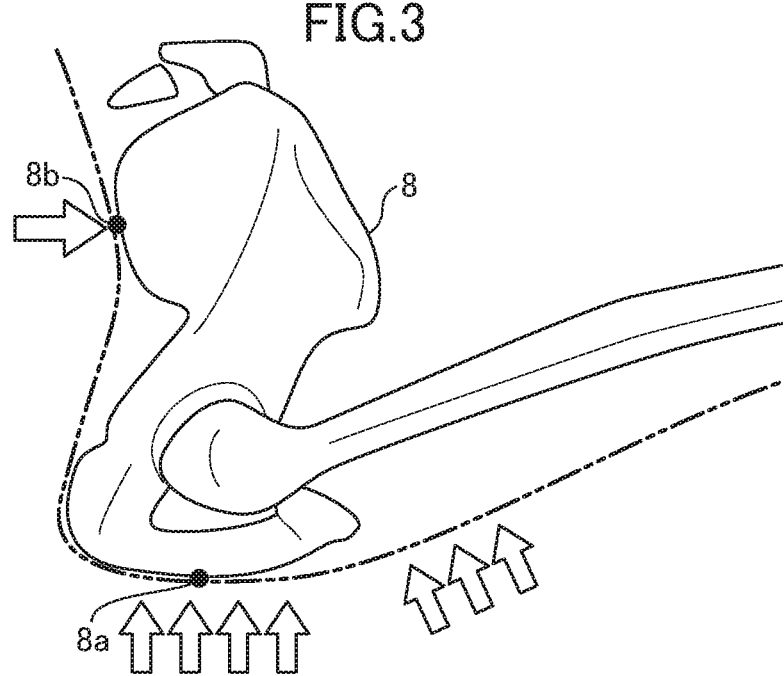
FIG. 3 is a diagram illustrating the support of the pelvis of the occupant by the vehicle seat according to this embodiment.
Figure 4:
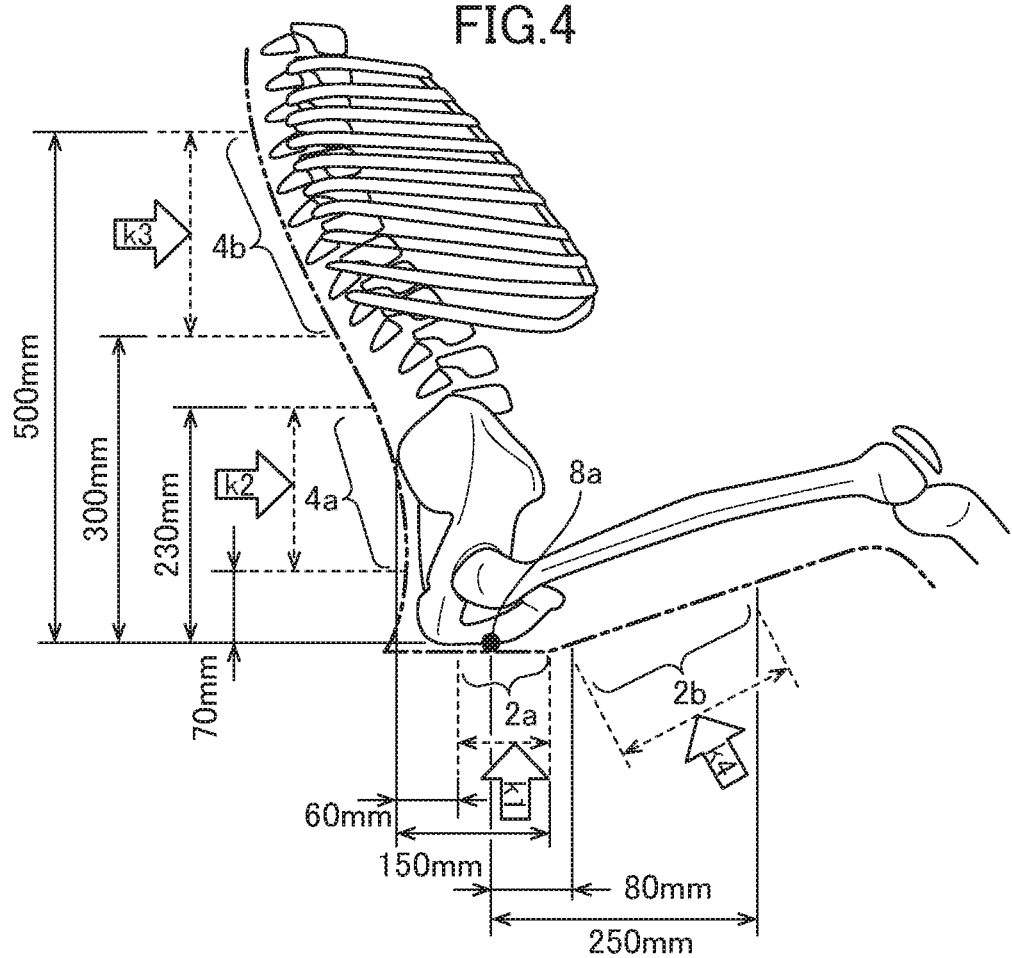
FIG. 4 is a diagram specifically showing dimensions of various portions of the vehicle seat according to this embodiment.

FIG. 1 is a schematic diagram showing the entirety of the vehicle seat according to this embodiment. FIG. 2 is a diagram illustrating the support of the bones of an occupant by the vehicle seat according to this embodiment. FIG. 3 is a diagram illustrating the support of the pelvis of the occupant by the vehicle seat according to this embodiment. FIG. 4 is a diagram specifically showing dimensions of various portions of the vehicle seat according to this embodiment.

As shown in FIG. 1, the vehicle seat 1 according to this embodiment comprises a seat cushion 2, a seat back 4, and a headrest 6. Each of the seat cushion 2, the seat back 4 and the headrest 6 comprises a frame made of metal, an elastic member, and a cushioning member made of urethane or the like and formed to wrap the frame and the elastic member (these components are not shown).

The seat cushion 2 comprises an ischium supporting portion 2a oriented to extend approximately horizontally to support ischial tuberosity point 8a of an occupant D seated in the vehicle seat 1 (the occupant D is supported by the seat cushion 2 at the ischial tuberosity point 8a), and a femur supporting portion 2b provided forward of the ischium supporting portion 2a to extend obliquely upwardly from the ischium supporting portion 2a. It should be noted here that, as used in this specification, the term "forward direction" of the vehicle seat 1 means a direction toward a side opposite to the seat back 4. Further, although the vehicle seat 1 in this embodiment is a driver seat for a vehicle, the present invention can also be applied to any vehicle seat other than the driver seat, such as a front passenger seat for a vehicle.

The seat back 4 comprises a hipbone supporting portion 4a for supporting the hipbones of the seated occupant D, and a thorax supporting portion 4b provided above the hipbone support portion 4a to support the thorax of the seated occupant D. The headrest 6 is attached to an upper end of the seat back 4 and disposed to support the back of the head of the occupant D.

Next, with reference to FIGS. 2 and 3, the support of the bones of the occupant by the seat cushion 2 and the seat back 4 will be described. In FIGS. 2 and 3, for illustrative purposes, the occupant D is shown by the bones thereof.

As shown in FIG. 2, the occupant D is seated in the vehicle seat 1, while the ischial tuberosity point 8a thereof, which are lower ends of the hipbones of the pelvis 8, and the vicinity thereof, are supported from therebelow by the ischium supporting portion 2a of the seat cushion 2. Further, the occupant D is seated while the vicinities of the middles of the femurs 10 thereof are supported from therebelow in an obliquely rearward direction by the femur supporting portion 2b of the seat cushion 2. Specifically, the femur supporting portion 2b of the seat cushion 2 is inclined such that it becomes gradually higher in the forward direction of the vehicle seat 1, so that, due to this inclination, the occupant D seated in the vehicle seat 1 is displaced toward a rearward side of the vehicle seat 1, and the back of the occupant D is moderately pressed against the seat back 4. Here, a desirable inclination angle of the femur supporting portion 2b with respect to a horizontal plane depends on a height directional length from a heel point to a hip point of the seated occupant. Specifically, when the height directional length is 255 mm, the inclination angle is in the range of about 18 to 19 degrees, and when the height directional length is 300 mm, the inclination angle is in the range of about 15 to 16 degrees Further, the occupant D is seated while rear ends 8b of the hipbones of the pelvis 8 thereof are supported from therebehind by the hipbone supporting portion 4a of the seat back 4. Further, the occupant D is seated while the thorax 12 thereof is supported from therebehind, around a center-of-gravity point 12a of the thorax 12, by the thorax supporting portion 4b of the seat back 4. Generally, the center-of-gravity point 12a of the thorax 12 is located in the vicinity of the 7th thoracic vertebra of a human body. Preferably, the thorax supporting portion 4b is configured to support the thorax 12 with an area covering about 2.5 times the width of the thoracic vertebra, around the center-of-gravity point 12a thereof, thereby prevent an excessively large bending force from acting on the spinal column.

FIG. 3 is a diagram enlargedly showing the pelvis 8 of the occupant D supported by the vehicle seat 1. As shown in FIG. 3, the ischial tuberosity point 8a of the pelvis 8 of the occupant D are supported from therebelow by the ischium supporting portion 2a oriented to extend approximately horizontally. Further, because, due to the inclination of the femur supporting portion 2b, the back of the occupant D is moderately pressed against the seat back 4, the rear ends 8b of the hipbones of the pelvis 8 are supported from therebehind by the hipbone supporting portion 4a. As above, when the occupant D is simply seated in the vehicle seat 1, the pelvis 8 of the occupant D is guided to the lowered ischium supporting portion 2a of the vehicle seat 1, and erected at an adequate angle. Further, the pelvis 8 of the occupant D is supported from two directions by the ischial tuberosity point 8a and the rear ends 8b of the hipbones, so that it is held at a proper position and at a proper angle.

Next, with reference to FIG. 4, the position of each portion in the vehicle seat 1 according to this embodiment will be described in detail.

As shown in FIG. 4, the ischium supporting portion 2a of the seat cushion 2 is is provided to fall within the range of 60 mm to 150 mm as measured horizontally forwardly from the position of the rear ends 8b of the hipbones of the seated occupant D.

The femur supporting portion 2b of the seat cushion 2 is provided to fall within the range of 80 mm to 250 mm as measured horizontally forwardly from the position of the ischial tuberosity point 8a of the seated occupant D.

Further, the hipbone supporting portion 4a of the seat back 4 is provided to fall within the range of 70 mm to 230 mm as measured vertically upwardly from the position of the ischial tuberosity point 8a of the seated occupant D.

The thorax supporting portion 4b of the seat back 4 is provided to fall within the range of 300 mm to 500 mm as measured vertically upwardly from the position of the ischial tuberosity point 8a of the seated occupant D.

The above positions of the ischium supporting portion 2a, the femur supporting portion 2b, the hipbone supporting portion 4a and the thorax supporting portion 4b have been set based on dimensions of a human body dummy model, wherein they can be adapted to various models from a small-size model (AF05) having a body height of 150 cm to a large-size model (DM95) having a body height of 189 cm.

By adequately setting a spring constant of each of the portions of the vehicle seat 1 whose dimensions and positions are set in the above manner, the vehicle seat 1 can be configured to provide good riding comfort. Here, the spring constant of each of the portions of the vehicle seat 1 is measured by using an F-S meter. In this embodiment, the spring constant $k_1$ [N/mm] of the ischium supporting portion 2a is calculated by the following formula: $k_1 = 200/X_1$ [N/mm], where $X_1$ is a displacement [mm] of a disk having a diameter of 200 mm, occurring when the disk is placed onto the surface of the ischium supporting portion 2a to apply a force of 200 [N] to the ischium supporting portion 2a in a direction orthogonal to the surface of the ischium supporting portion 2a. Similarly, the spring constant $k_4$ [N/mm] of the femur supporting portion 2b is calculated by the following formula: $k_4 = 200/X_4$ [N/mm], where $X_4$ is a displacement [mm] of a disk having a diameter of 200 mm, occurring when the disk is placed onto the surface of the femur supporting portion 2b to apply a force of 200 [N] to the ischium supporting portion 2a in a direction orthogonal to the surface of the femur supporting portion 2b.

Further, the spring constant $k_2$ [N/mm] of the hipbone supporting portion 4a is calculated by the following formula: $k_2 = 100/X_2$ [N/mm], where $X_2$ is a displacement [mm] of a disk having a diameter of 100 mm, occurring when the disk is placed onto the surface of the hipbone supporting portion 4a to apply a force of 100 [N] to the hipbone supporting portion 4a in a direction orthogonal to the surface of the hipbone supporting portion 4a. The spring constant $k_3$ [N/mm] of the thorax supporting portion 4b is calculated by the following formula: $k_3 = 100/X_3$ [N/mm], where $X_3$ is a displacement [mm] of a disk having a diameter of 100 mm, occurring when the disk is placed onto the surface of the thorax supporting portion 4b to apply a force of 100 [N] to the thorax supporting portion 4b in a direction orthogonal to the surface of the thorax supporting portion 4b.

In this embodiment, the spring constant $k_1$ of the ischium supporting portion 2a and the spring constant $k_4$ of the femur supporting portion 2b measured in the above manner are set, respectively, to about 5 [N/mm] and about 2 [N/mm]. Further, the spring constant $k_2$ of the hipbone supporting portion 4a and the spring constant $k_3$ of the thorax supporting portion 4b measured in the above manner are set, respectively, to about 3 [N/mm] and about 3 [N/mm]

Next, with reference to FIGS. 5 to 7, the operation of the vehicle seat 1 according to this embodiment will be described.

Figure 5:
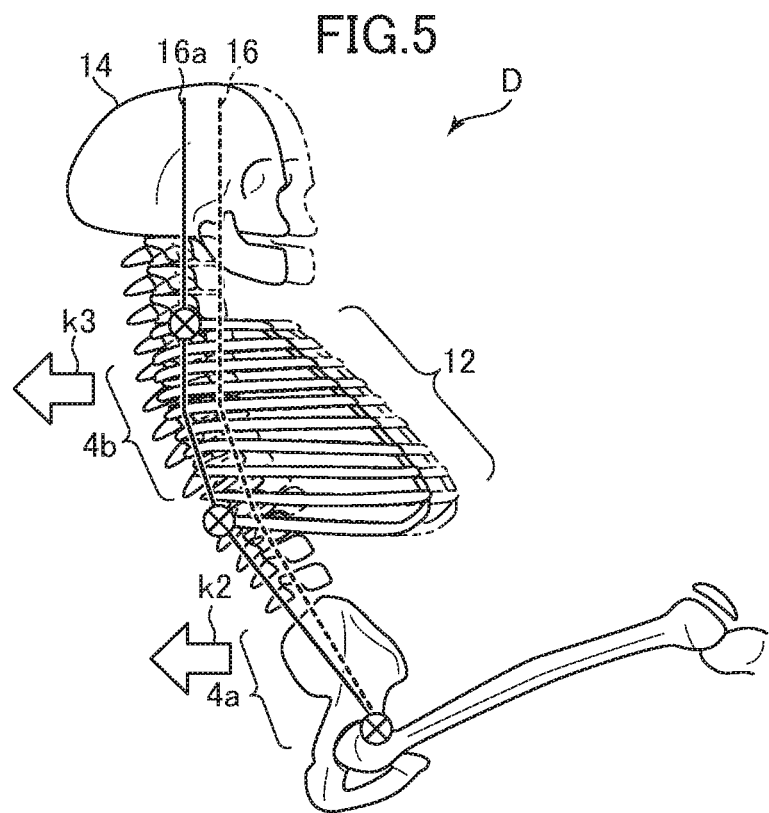
FIG. 5 is a diagram schematically showing the movement of the spinal column of an occupant seated in the vehicle seat according to this embodiment, in a state in which a vehicle equipped with the vehicle seat is accelerated.

FIG. 5 is a diagram schematically showing the movement of the spinal column of an occupant seated in the vehicle seat 1 according to this embodiment, in a state in which a vehicle equipped with the vehicle is accelerated. FIG. 6 is a diagram schematically showing the movement of the spinal column of the occupant seated in the vehicle seat according to this embodiment, in a state in which the vehicle is decelerated. FIG. 7 is a diagram schematically showing, as a comparative example, the movement of the spinal column of an occupant seated in a conventional vehicle seat, in a state in which a vehicle equipped with the vehicle seat is accelerated.

As shown in FIG. 5, when a vehicle equipped with the vehicle seat 1 is stopped, or is traveling at a constant vehicle speed, the spinal column of an occupant D seated in the vehicle seat 1 is roughly located at a position indicated by the broken line 16 in FIG. 5. When the vehicle is accelerated from this state, the upper body of the occupant D is pressed against the seat back 4 by the inertia force. The upper body of the occupant pressed against the seat back 4 sinks in the seat back 4. In this situation, a displacement (sinking amount) of each region of the upper body is determined mainly by the spring constant $k_2$ of the hipbone supporting portion 4a and the spring constant $k_3$ of the thorax supporting portion 4b.

In this embodiment, the spring constant $k_3$ of the thorax supporting portion 4b and the spring constant $k_2$ of the hipbone supporting portion 4a are set to be approximately equal to each other, so that the spinal column of the occupant D is moved to a position indicated by the solid line 16a. As a result, the head 14 of the occupant D is moved in a translational manner together with the thorax 12. Preferably, the spring constant k3 of the thorax supporting portion 4b is set to be about 1 time to about 0.8 times the spring constant k2 of the hipbone supporting portion 4a. In this case, the head 14 and thorax 12 of the occupant D can be moved in an approximately translational manner. Therefore, almost no force causing the head 14 of the occupant D to be rotated rearwardly is applied to the head 14, so that the occupant D needs not strain at the neck so as to keep the position of the head 14 during vehicle acceleration, i.e., can easily maintain a natural posture. That is, even during vehicle acceleration, the occupant D can naturally maintain the position of the head 14 as if he/she were walking, and can stably keep the direction of the gaze.

On the other hand, in a conventional vehicle seat as shown in FIG. 7 as a comparative example, during vehicle acceleration, the spinal column of an occupant D is disposed from a position indicated by the broken line 16 to a position indicated by the solid line 16a. As shown in FIG. 7, in the conventional vehicle seat, a displacement of a thorax supporting portion 4b during vehicle acceleration is small, so that the thorax of the occupant D is pushed forwardly relative to the head 14, and a force causing the head 14 of the occupant D to be rotated rearwardly about the cervical spine 14a serving as a supporting point is applied to the head 14. Thus, during vehicle acceleration, the spinal column of the occupant D is displaced to the position indicated by the solid line 16a in FIG. 7, so that the head 14 of the occupant D is rotated rearwardly, causing deviation of the direction of the gaze. In order to avoid such a rearward rotation of the head 14, the occupant D needs to strain at the neck so as to maintain the position of the head 14, which becomes a factor for giving the occupant D a feeling of fatigue.

Figure 6:
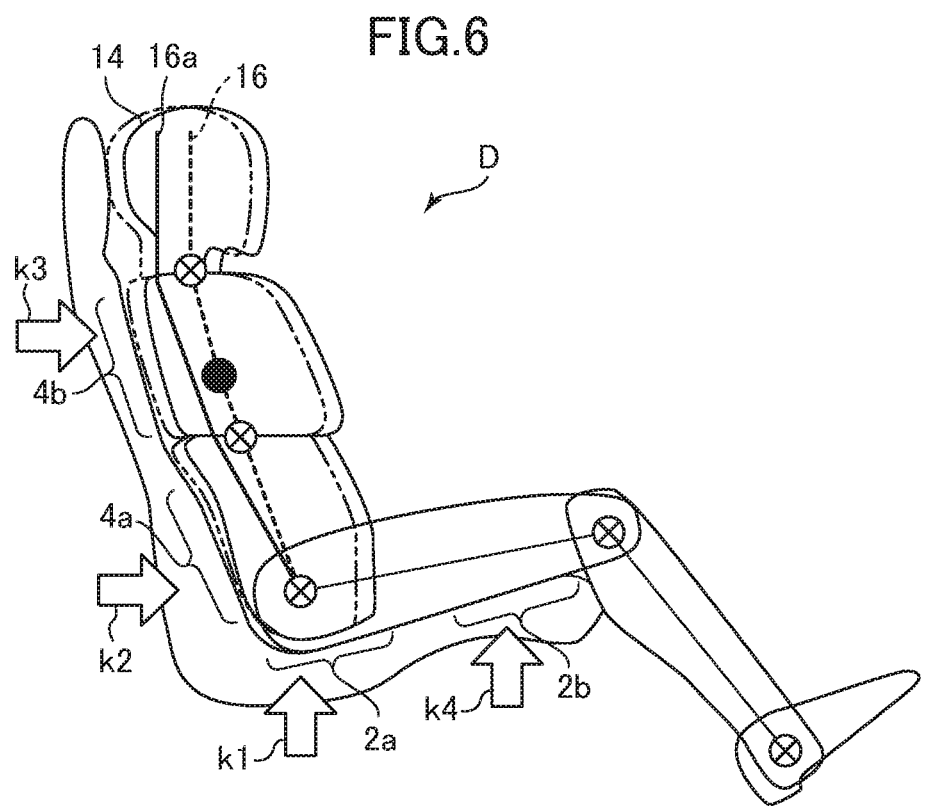
FIG. 6 is a diagram schematically showing the movement of the spinal column of the occupant seated in the vehicle seat according to this embodiment, in a state in which the vehicle is decelerated.

Subsequently, when the vehicle is decelerated (when the occupant returns an accelerator pedal to end the vehicle acceleration), the spinal column of the occupant D sunk to the position indicated by the solid line 16a in FIG. 6 by vehicle acceleration is pushed back to the position indicated by the broken line 16 by a rebound force of the seat back 4, as shown in FIG. 6. In the vehicle seat 1 according to this embodiment, the spring constant k2 of the hipbone supporting portion 4a and the spring constant k3 of the thorax supporting portion 4b are adequately set. Thus, upon the end of vehicle acceleration, the spinal column of the occupant D is naturally returned to the original position before vehicle acceleration, by the rebound force of the seat back 4. Preferably, a vibrational damping property of the thorax supporting portion 4b is set such that a resonance magnification of the thorax supporting portion 4b becomes about 2 or less. In this case, it is possible to prevent a phenomenon that the upper body of the occupant D bounces on the seat back 4 by the rebound force.

Further, in the vehicle seat 1 according to this embodiment, the spring constant k4 of the femur supporting portion 2b is set to be less than the spring constant k1 of the ischium supporting portion 2a. Thus, when an occupant D seated in the vehicle seat 1 presses down on an accelerator pedal or the like, the femur supporting portion 2b is easily depressed by a relatively weak force, without hindering the leg of the occupant D from manipulating the accelerator pedal or the like. Preferably, the spring constant k4 of the thorax supporting portion 4b is set to be about 0.4 times to about 0.6 times the spring constant k1 of the ischium supporting portion 2a.

In the vehicle seat 1 according to the above embodiment, the seat back is configured such that the spring constant k3 of the thorax supporting portion 4b is equal to or less than the spring constant k2 of the hipbone supporting portion 4a (FIG. 4). Therefore, the thorax 12 and head 14 of the occupant D pressed against the seat back 4 by the acceleration are moved in an approximately translational manner, so that a force causing the head 14 to be rotated rearwardly becomes smaller. This allows the occupant D to easily maintain a proper posture.

In the vehicle seat 1 according to the above embodiment, the seat cushion is configured such that the spring constant k4 of the femur supporting portion 2b is less than the spring constant k1 of the ischium supporting portion 2a, so that the femur supporting portion 2b can be easily displaced during the pedal manipulation by the occupant D, thereby suppressing a negative influence on the pedal manipulation.

In the vehicle seat 1 according to the above embodiment, the hipbone supporting portion 4a is provided to fall within the range of 70 mm to 230 mm as measured vertically upwardly from the position of the ischial tuberosity point 8a of the seated occupant D, so that it is possible to properly support the hipbones of any of a large number of occupants D having various physiques.

In the vehicle seat 1 according to the above embodiment, the thorax supporting portion 4b is provided to fall within the range of 300 mm to 500 mm as measured vertically upwardly from the position of the ischial tuberosity point 8a of the seated occupant D, so that it is possible to properly support the thorax 12 of any of a large number of occupants D having various physiques.

In the vehicle seat 1 according to the above embodiment, the femur supporting portion 2b is provided to fall within the range of 80 mm to 250 mm as measured horizontally forwardly from the position of the ischial tuberosity point 8a of the seated occupant D, so that it is possible to properly support the femurs 10 of any of a large number of occupants D having various physiques.

In the vehicle seat 1 according to the above embodiment, the ischium supporting portion 2a is provided to fall within the range of 60 mm to 150 mm as measured horizontally forwardly from the position of rear ends 8b of the hipbones of the seated occupant D, so that it is possible to properly support the pelvis 8 of any of a large number of occupants D having various physiques.

LIST OF REFERENCE SIGNS

1: vehicle seat
2: seat cushion
2a: ischium supporting portion
2b: femur supporting portion
4: seat back
4a: hipbone supporting portion
4b: thorax supporting portion
6: headrest
8: pelvis
8a: ischial tuberosity point
8b: rear end of hipbone
10: femur
12: thorax
12a: center-of-gravity point of thorax
14: head
14a: cervical spine

The invention claimed is:

1. A vehicle seat comprising:
a seat back including a hipbone supporting portion for supporting a hipbone of a seated occupant, and a thorax supporting portion provided above the hipbone support portion to support a thorax of the seated occupant, wherein the seat back is formed by a frame member and a cushioning member wrapping the frame member, and the thorax supporting portion is provided on an area of the seat back including a center-of-gravity point of the thorax of the seated occupant; and
a seat cushion including an ischium supporting portion oriented to extend approximately horizontally to support an ischial tuberosity point of the seated occupant, and a femur supporting portion provided forward of the ischium supporting portion to extend obliquely upwardly from the ischium supporting portion,
wherein the seat back is configured such that a spring constant of the thorax supporting portion is about 1 time to about 0.8 times a spring constant of the hipbone supporting portion;
wherein the seat cushion is configured such that a spring constant of the femur supporting portion is less than a spring constant of the ischium supporting portion; and
wherein the hipbone supporting portion and the thorax supporting portion support the seated occupant such that a head of the seated occupant is moved in a translational manner together with the thorax of the seated occupant, when the seated occupant returns an accelerator pedal to end a vehicle acceleration.

2. The vehicle seat according to claim 1, wherein the hipbone supporting portion is provided to fall within a range of 70 mm to 230 mm as measured vertically upwardly from a position of the ischial tuberosity point of the seated occupant.

3. The vehicle seat according to claim 1, wherein the thorax supporting portion is provided to fall within a range of 300 mm to 500 mm as measured vertically upwardly from a position of the ischial tuberosity point of the seated occupant.

4. The vehicle seat according to claim 1,
wherein the hipbone supporting portion is provided to fall within a range of 70 mm to 230 mm as measured vertically upwardly from a position of the ischial tuberosity point of the seated occupant;
wherein the thorax supporting portion is provided to fall within a range of 300 mm to 500 mm as measured vertically upwardly from a position of the ischial tuberosity point of the seated occupant; and
wherein the femur supporting portion is provided to fall within a range of 80 mm to 250 mm as measured horizontally forwardly from a position of the ischial tuberosity point of the seated occupant.

5. The vehicle seat according to claim 1,
wherein the hipbone supporting portion is provided to fall within a range of 70 mm to 230 mm as measured vertically upwardly from a position of the ischial tuberosity point of the seated occupant;
wherein the thorax supporting portion is provided to fall within a range of 300 mm to 500 mm as measured vertically upwardly from a position of the ischial tuberosity point of the seated occupant; and
wherein the ischium supporting portion is provided to fall within the range of 60 mm to 150 mm as measured horizontally forwardly from a position of a rear end of the hipbones of the seated occupant.

6. The vehicle seat according to claim 2, wherein the thorax supporting portion is provided to fall within a range of 300 mm to 500 mm as measured vertically upwardly from a position of the ischial tuberosity point of the seated occupant.

7. The vehicle seat according to claim 1, wherein the spring constant of the ischium supporting portion is set to be about 0.4 times to about 0.6 times the spring constant of the ischium supporting portion.

8. The vehicle seat according to claim 1, wherein a vibrational damping property of the thorax supporting portion is set such that a resonance magnification of the thorax supporting portion becomes about 2 or less.

* * * * *